(12) United States Patent
Shoji et al.

(10) Patent No.: US 9,112,412 B2
(45) Date of Patent: Aug. 18, 2015

(54) FULL-BRIDGE POWER CONVERTER

(71) Applicant: TOYO SYSTEM CO., LTD., Iwaki-shi, Fukushima (JP)

(72) Inventors: Hideki Shoji, Iwaki (JP); Seiji Kawaberi, Iwaki (JP); Shigeki Nakajima, Iwaki (JP)

(73) Assignee: TOYO SYSTEM CO., LTD., Iwaki-shi (JP)

( * ) Notice: Subject to any disclaimer, the term of this patent is extended or adjusted under 35 U.S.C. 154(b) by 37 days.

(21) Appl. No.: 14/131,560

(22) PCT Filed: Apr. 15, 2013

(86) PCT No.: PCT/JP2013/061693
§ 371 (c)(1),
(2) Date: Jan. 8, 2014

(87) PCT Pub. No.: WO2014/002590
PCT Pub. Date: Jan. 3, 2014

(65) Prior Publication Data
US 2014/0140114 A1 May 22, 2014

(30) Foreign Application Priority Data
Jun. 27, 2012 (JP) ................................. 2012-143979

(51) Int. Cl.
*H02M 7/5387* (2007.01)
*H02M 7/219* (2006.01)
*H02M 1/12* (2006.01)

(52) U.S. Cl.
CPC .......... *H02M 7/219* (2013.01); *H02M 7/53871* (2013.01); *H02M 2001/123* (2013.01)

(58) Field of Classification Search
CPC ... H02M 3/33507; H02M 3/28; H02M 7/537; H02M 7/5387
USPC .................... 363/15–17, 95, 97–98, 131–132
See application file for complete search history.

(56) References Cited

U.S. PATENT DOCUMENTS 6,016,258 A * 1/2000 Jain et al. ........................ 363/17
6,130,831 A 10/2000 Matsunaga
(Continued)

FOREIGN PATENT DOCUMENTS

JP 2000-134943 A 5/2000
JP 2002-58253 A 2/2002
(Continued)

OTHER PUBLICATIONS

International Search Report of PCT/JP2013/061693, dated Jun. 4, 2013.

*Primary Examiner* — Adolf Berhane
*Assistant Examiner* — Henry Lee, III
(74) *Attorney, Agent, or Firm* — Sughrue Mion, PLLC

(57) ABSTRACT

A full-bridge power converter is provided. A control unit 30 generates control signals for individual switching elements for controlling ON/OFF operation of switching elements 11~14, alternately turns the switching element 11 and switching element 12 ON/OFF, also alternately turns the switching element 13 and switching element 14 ON/OFF, outputs supply current from a full-bridge circuit 10 for supplying to a load 3, and, during a period when the supply current is not supplied, turns ON both the switching element 11 and switching element 13 to pass inertial current by discharging energy stored in inductors 16 and 17, and filter capacitors 19 and 20 absorb the charge of common-mode noise components appearing on an output line connecting the inductor 16 and an output capacitor 18 and on an output line connecting the inductor 17 and the output capacitor 18.

2 Claims, 5 Drawing Sheets

(56) References Cited

U.S. PATENT DOCUMENTS

| | | |
|---|---|---|
| 6,256,209 B1 * | 7/2001 | Gurwicz et al. ............... 363/17 |
| 2004/0125618 A1 * | 7/2004 | De Rooij et al. ............... 363/17 |
| 2006/0007719 A1 * | 1/2006 | Shannon et al. ............. 363/132 |
| 2007/0171684 A1 | 7/2007 | Fukumoto |
| 2011/0051467 A1 | 3/2011 | Nakanishi |
| 2011/0115285 A1 * | 5/2011 | Ransom et al. ............... 307/9.1 |
| 2012/0120684 A1 * | 5/2012 | Tol et al. ............... 363/17 |
| 2012/0224403 A1 * | 9/2012 | Wu et al. ............... 363/132 |

FOREIGN PATENT DOCUMENTS

| | | |
|---|---|---|
| JP | 2011-50134 A | 3/2011 |
| JP | 2012-10514 A | 1/2012 |
| WO | 2005/086336 A1 | 9/2005 |

* cited by examiner

FULL-BRIDGE POWER CONVERTER

CROSS REFERENCE TO RELATED APPLICATIONS

This application is a National Stage of International Application No. PCT/JP2013/061693 filed Apr. 15, 2013 (claiming priority based on Japanese Patent Application No. 2012-143979, filed Jun. 27, 2012), the contents of which are incorporated herein by reference in their entirety.

TECHNICAL FIELD

This invention relates to a full-bridge power converter for converting and outputting DC power.

BACKGROUND ART

When power conversion is performed using a full-bridge circuit, an isolated power supply is connected to input points of the full-bridge circuit, a load or the like is connected to output points of the full-bridge circuit, and operation is performed in a floating potential condition without grounding these input and output points (as in motor driving or the like, for example). This is called floating operation.

FIG. 5 is an explanatory diagram showing connection of a conventional full-bridge power converter used in floating condition. In this diagram, an isolated power supply 102 is connected to the input side and a load 103 is connected to the output side of a full-bridge power converter 101. Further, an input capacitor 111 is connected between the two input terminals of the full-bridge power converter 101.

A full-bridge circuit 110 is equipped with four switching elements S1~S4. The switching element S1 and switching element S2 are series connected, and the switching element S3 and switching element S4 are series connected. The isolated power supply 102 is a power source that outputs DC power, its power output terminals are adapted for isolated output, and Y capacitors Cy are connected between these output terminals and a ground is provided between the Y capacitors Cy.

A connection point between the switching element S1 and switching element S3 is connected to one input terminal of the full-bridge power converter 101.

A connection point between the switching element S2 and switching element S4 is connected to another input terminal of the full-bridge power converter 101.

Further, one end of an inductor 112 is connected to a connection point between the switching element S1 and switching element S2, and one end of an inductor 113 is connected to a connection point between the switching element S3 and the switching element S4.

An output capacitor 114 is connected between another end of the inductor 112 and another end of the inductor 113, and the output terminals of the full-bridge power converter 101 are connected across this output capacitor 114.

The switching operation of the switching elements S1 to S4 of the full-bridge circuit 110 is controlled by an unshown control unit to operate so that the switching elements S2 and S3 are turned OFF when the switching elements S1 and S4 are turned ON and the switching elements S1 and S4 are turned OFF when the switching elements S2 and S3 are turned ON.

When DC voltage is supplied from the isolated power supply 102, the full-bridge power converter 101 outputs power to the load 103 in a floating potential condition. At this time, the switching elements of the full-bridge circuit 110 repeat ON/OFF operation to make it possible to control the values and polarity of the voltage and current output to the load 103 by this switching operation.

Moreover, when performing power conversion in common mode, there are cases in which, as described in patent reference 1, for example, power output from a bridge circuit is output to a load or the like through a transformer whose primary winding and secondary winding are isolated. A known practice is to interpose a transformer or the like in this manner so as to output power lowered in common-mode noise attributable to a bridge circuit or the like.

PRIOR ART REFERENCE

Patent Reference

Patent reference 1: Japanese Unexamined Patent Application Publication No. 2011-050134

SUMMARY OF THE INVENTION

Problem to be Solved by the Invention

Conventionally, a power converter using a full-bridge circuit is heretofore configured as described above, and the switching elements are operated to produce a two-level output. As this switching operation produces ripple components in the input and output currents, smoothing capacitors having considerable ripple tolerance need to be installed to absorb this ripple current.

The number of parallel-connected capacitors needs to be increased particularly on the input side owing to the occurrence of very large ripple current having the same effective value as the DC output current, so that there has been a problem of large converter size and also high cost.

Techniques are available for overcoming the aforesaid problem point by operating the full-bridge circuit in common mode, but the high common-mode noise that occurs during such operation makes it necessary to increase the isolation performance of the isolated power supply connected to the input side and make the impedance of the Y capacitors and the like high. However, when high impedance is established, noise occurring inside the isolated power supply is to the contrary exacerbated, so that this is not a realistic solution. Ultimately, the only effective method of dealing with large ripple current is to use output power in floating condition, so that there has been a problem of not being able to connect to ground.

This invention was made to solve the aforesaid problems and has as its object to provide a full-bridge power converter that inhibits ripple current and common-mode noise occurring when operating a full-bridge circuit.

Means for Solving the Problems

The full-bridge power converter according to this invention comprises a full-bridge circuit constituted by series-connecting one end of a first switching element and one end of a second switching element, series-connecting one end of a third switching element and one end of a fourth switching element, and parallel-connecting the series-connected first and second switching elements and the series-connected third and fourth switching elements, a control unit for individually controlling ON/OFF operation of the first switching element to the fourth switching element, an input capacitor connected between a first connection point connecting between another end of the first switching element and another end of the third switching element and a second connection point connecting between another end of the second switching element and another end of the fourth switching element, a first inductor connected at one end to a third connection point connecting between the one end of the first switching element and the one end of the second switching element, a second inductor connected at one end to a fourth connection point connecting between the one end of the third switching element and the one end of the fourth switching element, an output capacitor connected between another end of the first inductor and another end of the second inductor, a first filter capacitor connected between the other end of the first inductor and the first connection point, and a second filter capacitor connected between the other end of the second inductor and the second connection point, wherein, when a power supply that outputs DC voltage is connected to opposite ends of the input capacitor and a load is connected to opposite ends of the output capacitor, the control unit generates control signals for the individual switching elements for controlling ON/OFF operation of the switching elements, turns the first switching element and the second switching element ON and OFF alternately and turns the third switching element and the fourth switching element ON and OFF alternately to output from the full-bridge circuit supply current for supply to the load, during a period when the supply current is not output, turns ON both the first switching element and the third switching element and turns OFF both the second switching element and the fourth switching element to connect between the third connection point and the fourth connection point and pass inertial current by discharging energy stored in the first and second inductors, and when whichever of the ON-state time durations of the first switching element and the third switching element is shorter is defined as time duration Tm, an overlap period wherein an ON/OFF-state of a switching element whose ON-state time duration is longer and an ON/OFF-state of a switching element whose ON-state time duration is shorter are the same is defined as Td, and a drive overlap ratio indicating a ratio of the overlap period Td to the time duration Tm is defined as Rd=(Td/Tm)×100%, controls operation of the switching elements to make the drive overlap ratio Rd not less than 50% and not greater than 100%, the first and second filter capacitors have capacitance for storing charge of a common-mode noise component occurring on an output line connecting the first inductor and the output capacitor and an output line connecting the second inductor and the output capacitor, and absorb common-mode noise occurring when both the first switching element and the third switching element are turned ON and both the second switching element and the fourth switching element are turned OFF.

Further, where voltage input to the full-bridge circuit is defined as Vin, frequency of common-mode noise to be suppressed is defined as f, and inductance of the first and second inductors is defined as L, and the charge of the common-mode noise component is determined as Q=Vin/(32 Lf^2), the first and second filter capacitors have capacitance of Q/Vpp or greater when voltage amplitude of the common-mode noise is held to Vpp or less.

Effect of the Invention

This invention makes it possible to inhibit ripple current and reduce common-mode noise contained in output power.

MODES FOR CARRYING OUT THE INVENTION

Figure 5:
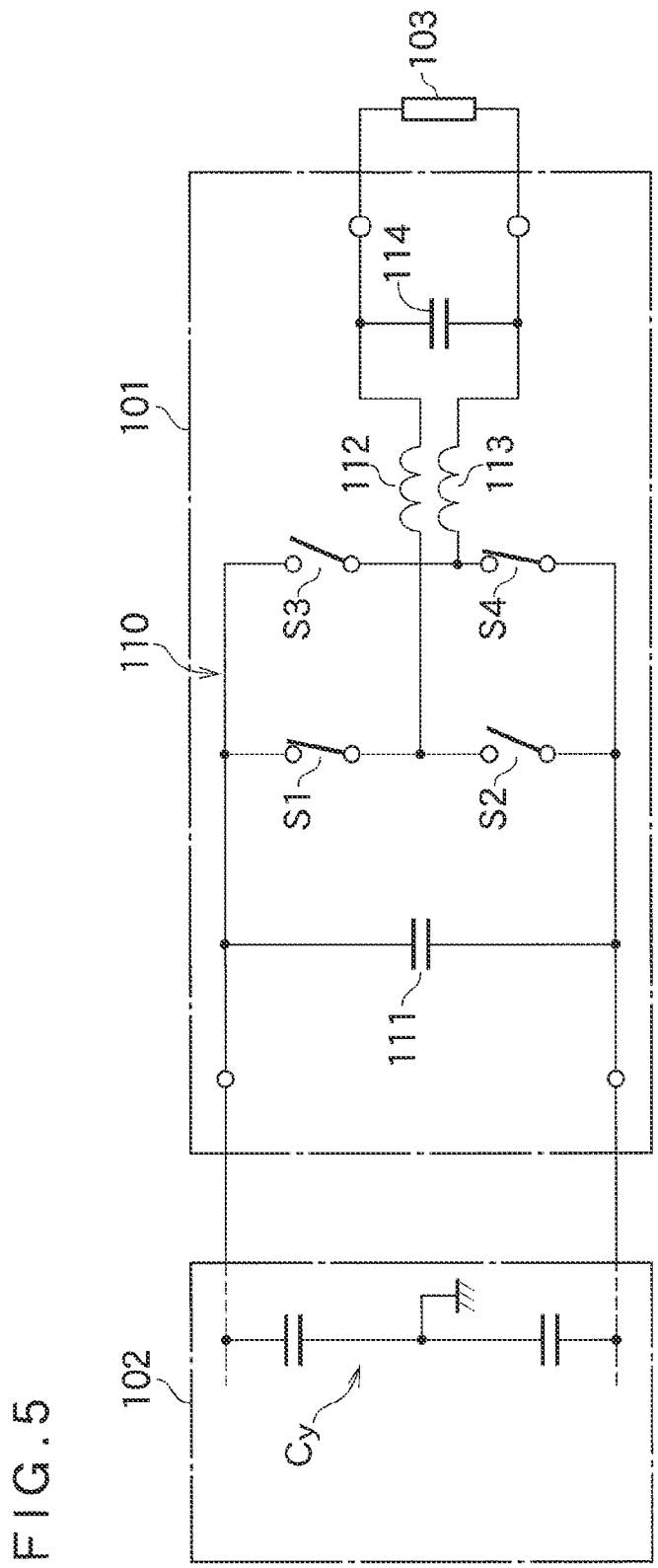
FIG. 5 is an explanatory diagram showing a connection configuration of a conventional full-bridge power converter used in floating condition.

The full-bridge power converter shown in FIG. 5 is equipped with an ordinary full-bridge circuit, and a line-to-line voltage (normal-mode output voltage) output from this full-bridge circuit is smoothed by the inductors 112 and 113 to obtain DC power.

When the output voltage of the aforesaid full-bridge circuit is viewed as common-mode (voltage-to-ground), the voltages of the two output lines of the full-bridge circuit are both square waves and have the amplitude of the value of the DC voltage input to this circuit.

The aforesaid full-bridge circuit performs symmetrical switching operation to produce an ordinary two-level output, and the voltages appearing on the two output lines proceed in opposite phase. As a result, occurrence of a common-mode voltage between the two output lines is inhibited by mutual cancellation.

The switching elements used in the full-bridge circuit generally have parasitic diodes or the like, and the properties of these parasitic diodes or the like sometimes differ between the switching elements. Owing to the differences in the properties and the like, the cancellation of the aforesaid common-mode voltages is therefore imperfect, so that common-mode voltages having the switching waveform of the DC voltage are produced. In a full-bridge circuit that performs ordinary two-level output operation, unintended common-mode voltages as described above sometimes occur.

The full-bridge power converter according to the present invention operates the full-bridge circuit so as to realize three-level output, and the switching elements of this full-bridge circuit are operated with the symmetry disrupted. The operation in which the aforesaid symmetry is disrupted is here called common-mode operation.

Since the full-bridge circuit is intentionally operated in common-mode operation with the symmetry disrupted, common-mode voltage naturally occurs. As pointed out above, the common-mode voltage has an amplitude corresponding to the input voltage of the full-bridge circuit, and its value is therefore very large when considered as output voltage noise.

In the present invention, when the full-bridge circuit is operated to have a three-level output, the common-mode voltage produced occurs at a frequency equal to the switching speed of the full-bridge circuit or a frequency related thereto.

As the common-mode voltage proceeds at a lower frequency than high-frequency noise, it is hard to reduce only by inductance provided on the output lines of the full-bridge circuit.

Further, as pointed out above, the common-mode voltage produced is of high amplitude and therefore propagates to other current paths from the output lines owing to the fluctuation of high electric power energy; for example, it invades the frame ground from the ground points of the Y capacitors connected to the output terminals and the like to become common-mode noise contained in the voltage-to-ground of each portion of the converter.

The full-bridge power converter of the present invention is equipped with the filter capacitors for reducing common-mode noise occurring in the three-level output.

In the following, an embodiment of this invention is explained based on the drawings.

Embodiment

Figure 1:
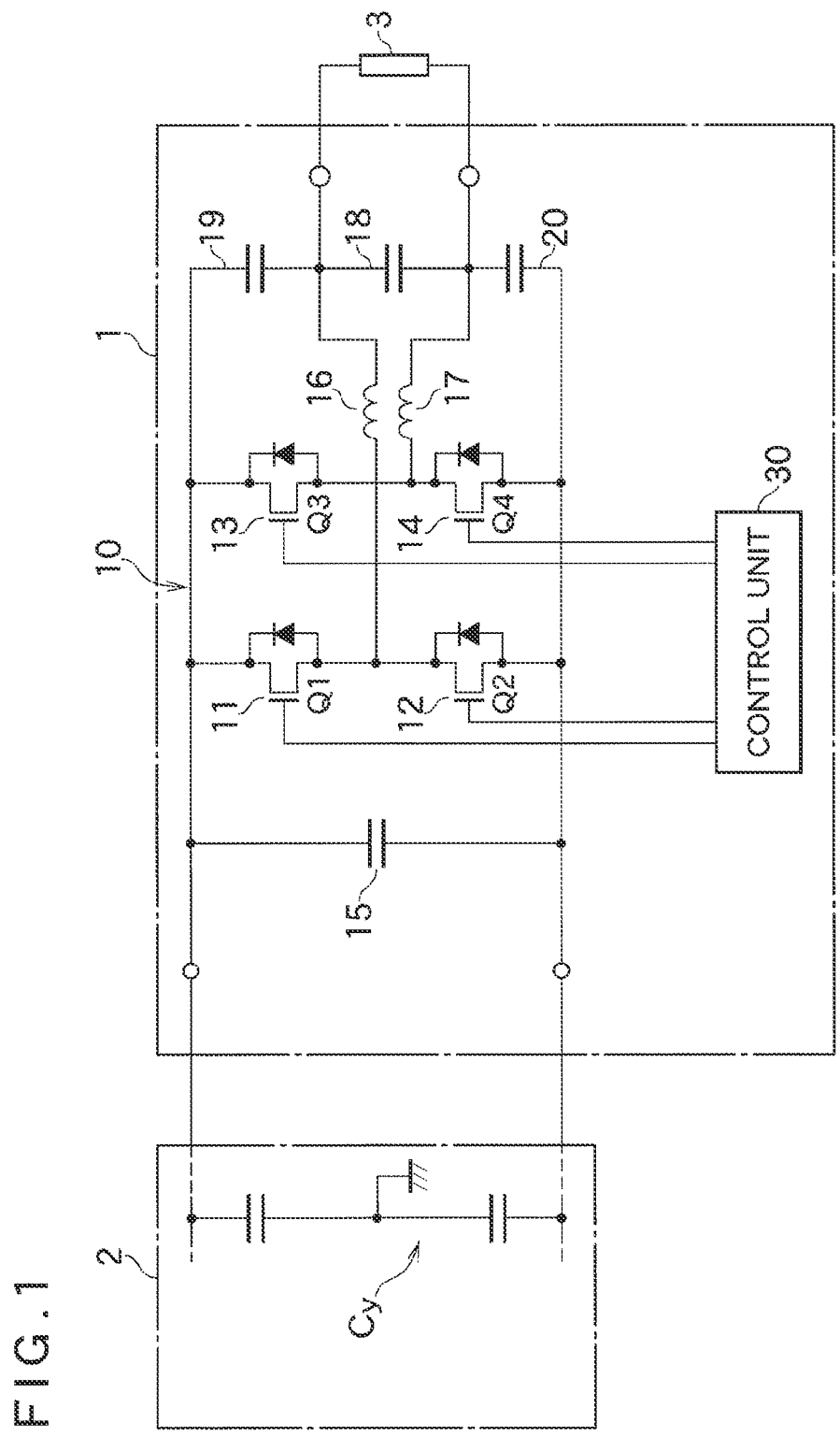
FIG. 1 is a circuit diagram schematically illustrating the configuration of a full-bridge power converter according to an embodiment of this invention.

FIG. 1 is a circuit diagram schematically illustrating the configuration of a full-bridge power converter according to an embodiment of this invention. The illustrated full-bridge power converter 1 is equipped with a full-bridge circuit 10 configured using four switching elements 11~14, and an isolated power supply 2 is connected to input points of the full-bridge circuit 10.

The four switching elements 11~14 are, for example, power MOSFETs or the like, and bipolar transistors, IGBTs or the like having adequate current-carrying capacity and suitable switching characteristics may be used.

The full-bridge circuit 10 has the switching element 11 and switching element 12 connected in series and the switching element 13 and switching element 14 connected in series.

The full-bridge circuit 10 has a first terminal of switch contacts of the switching element 11 and a first terminal of switch contacts of the switching element 13 connected together. This connection point is herein called a first connection point of the full-bridge circuit 10.

Further, the full-bridge circuit 10 has a first terminal of switch contacts of the switching element 12 and a first terminal of switch contacts of the switching element 14 connected together. This connection point is herein called a second connection point of the full-bridge circuit 10.

A connection point between a second terminal of the switch contacts of the switching element 11 and a second terminal of the switch contacts of the switching element 12 is herein called a third connection point of the full-bridge circuit 10, and a connection point between a second terminal of the switch contacts of the switching element 13 and a second terminal of the switch contacts of the switching element 14 is called a fourth connection point of the full-bridge circuit 10.

One end of an input capacitor 15 and a first output terminal of the isolated power supply 2 are connected to the first connection point. Another end of the input capacitor 15 and a second output terminal of the isolated power supply 2 are connected to the second connection point.

One end of an inductor 16 is connected to the third connection point. One end of an inductor 17 is connected to the fourth connection point. Another end of the inductor 16 is connected to one end of an output capacitor 18, and another end of the output capacitor 18 is connected to another end of the inductor 17.

Further, one end of a filter capacitor 19 is connected to the first connection point, and another end of the filter capacitor 19 is connected to a connection point between the inductor 16 and output capacitor 18.

One end of a filter capacitor 20 is connected to the second connection point, and another end of the filter capacitor 20 is connected to a connection point between the inductor 17 and output capacitor 18.

A connection point between the output capacitor 18 and filter capacitor 19 becomes a first output terminal of the full-bridge power converter 1, and a connection point between the output capacitor 18 and filter capacitor 20 becomes a second output terminal of the full-bridge power converter 1. A load 3, for example, is connected between the first output terminal and the second output terminal.

The isolated power supply 2 is, for example, one that converts input AC power to DC current of a prescribed voltage and is configured to output high potential side voltage from the first output terminal and output low potential side voltage from the second output terminal, and the second output terminal that outputs the low potential side voltage is not, among others, connected to ground.

Further, the isolated power supply 2 is equipped with Y capacitors Cy connected between the first output terminal and second output terminal. The Y capacitors Cy are two smoothing capacitors connected in series, and their intermediate point is electrically connected to ground (by frame-grounding) to be fixed at 0 [V].

When, for example, the full-bridge circuit 10 uses n-channel MOSFETs as the switching elements 11~14, the drains of the switching element 11 and switching element 13 are connected together, and the source of the switching element 11 and the drain of the switching element 12 are connected. Further, the source of the switching element 13 is connected to the drain of the switching element 14, and the sources of the switching element 12 and switching element 14 are connected together.

The gates of the switching elements 11~14 are connected to a control unit 30.

The switching elements 11~14 have parasitic diodes between their drains and sources, i.e., between the contacts, and in the case where the recovery property and the like of the parasitic diodes is inadequate when the inertial current mentioned later passes, suitably rated diodes are connected between the contacts of the switching elements.

The control unit 30, which controls the gate voltages of the switching elements 11~14, comprises, inter alia, a processor and a memory for storing a control program and the like. Moreover, with consideration to the type of the load 3, the purpose of the power supply and other factors, it is possible to configure the control unit 30 so that the operation of the switching elements 11~14 can be specified from the outside.

The load 3 is, for example, a secondary cell that is charged following use of the charged power and can be used repeatedly, specifically a battery cell, battery module, battery pack or the like for an automobile, ESS (energy storage system) or similar.

Moreover, a DC bus or the like of another device can be connected to the full-bridge power converter 1 as the load 3.

The operation will be explained next.

FIG. 2 is a set of explanatory diagrams showing the operation of the switching elements of the full-bridge power converter of FIG. 1. This drawing, which shows an example of the operation of the full-bridge circuit 10 of FIG. 1, is a set of timing charts indicating the operation timing of the switching elements, in which the switching element 11 is denoted as Q1, switching element 12 is denoted as Q2, switching element 13 is denoted as Q3, and switching element 14 is denoted as Q4. In the drawing, the periods exhibiting high level represent ON-states and the periods exhibiting low level represent OFF-states.

Figure 2A:
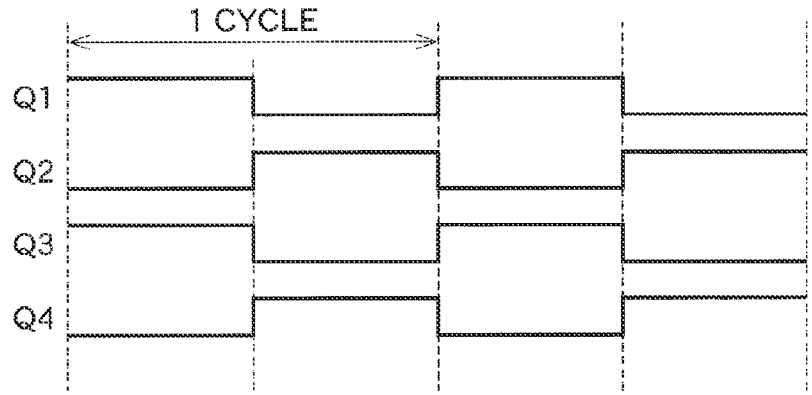
FIGS. 2(a), (b) and (c) are explanatory diagrams showing the operation of the switching elements of the full-bridge power converter of FIG. 1.

FIG. 2(a) shows the case where the ON-duties of the switching elements 11~14 (Q1~Q4) are made 50%.

Figure 2B:
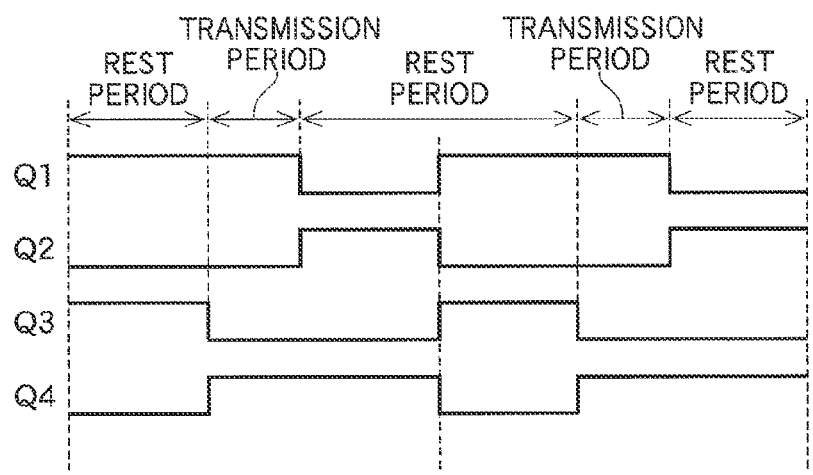

FIG. 2(b) shows the operation of the switching elements in the case where the ON-duty of the switching element 11 (Q1) is made greater than 50%. Specifically, the operation is shown in the case where the ON-duty of the switching element 14 (Q4) is made greater than 50% together with the switching element 11 (Q1) and the ON-duties of the switching element 12 (Q2) and switching element 13 (Q3) are made less than 50%.

Figure 2C:
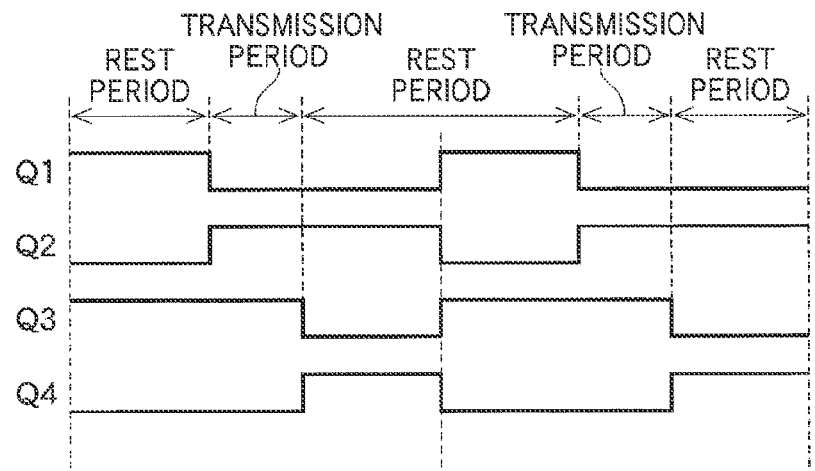

FIG. 2(c) shows the operation of the switching elements in the case where the ON-duty of the switching element 11 (Q1) is made less than 50%. Specifically, the operation is shown in the case where the ON-duty of the switching element 14 (Q4) is made less than 50% together with the switching element 11 (Q1) and the ON-duties of the switching element 12 (Q2) and switching element 13 (Q3) are made greater than 50%.

When the full-bridge circuit 10 is operated, dead times are established in the switching operation so as to prevent flow-through current from passing between the first connection point and the second connection point (between the input points of the full-bridge circuit 10).

In FIG. 2(a), for example, after a transition of the switching element 12 (Q2) to OFF-state, a dead time is a delay time added for a transition of the switching element 11 (Q1) to ON-state and is established for preventing two series-connected switching elements from both assuming ON-state by reason of the switching speeds of the switching elements.

Although dead times are also established in the switching operation of the full-bridge circuit 10 in the present embodiment, they are very short times when represented in the switching operation characterizing the present invention and are therefore not indicated in FIG. 2 and other drawings. Moreover, no attention is focused on dead times in this explanation of the operation.

In the switching operation indicated in FIGS. 2(a), (b) and (c), a period is established during which the switching element 11 (Q1) and switching element 13 (Q3) to which high potential side input voltage is applied both assume ON-state. Further, a period is established during which the switching element 12 (Q2) and switching element 14 (Q4) to which low potential side input voltage is applied both assume ON-state.

No period exists during which the switching element 11 (Q1) and switching element 12 (Q2) both assume ON-state or during which the switching element 13 (Q3) and switching element 14 (Q4) both assume ON-state. Moreover, depending on the purpose or the like of supplying power to the load 3, cases, above all, arise in which only the switching operation shown in FIG. 2(b) is performed, in which only the switching operation shown in FIG. 2(c) is performed, and in which the switching operations of FIGS. 2(b) and 2(c) are performed in combination.

As shown in FIG. 2(a), when the ON-duty is made 50% and the transition timing of all statuses (transition from ON to OFF and transition from OFF to ON of all switching elements) is synchronized, the potential difference between the two output points of the full-bridge circuit 10 disappears and the full-bridge circuit 10 outputs no power even if current flows. During this time, inertial current owing to the discharge of energy $W=\frac{1}{2} \cdot LI^2$ stored in advance in the inductor 16 and energy W stored in the inductor 17, or current attributable to a battery or the like (load 3) flow. Here, L is the combined inductance of the inductor 16 and inductor 17, and I is the current passing through the inductors 16 and 17.

In order for the full-bridge circuit 10 to transfer power input from the isolated power supply 2, the switching elements are operated, as shown in FIG. 2(b) or FIG. 2(c), for example, so that neither ON-to-OFF transition timing, nor OFF-to-ON transition timing, nor all transition timing is synchronized between the switching elements 11, 12 (Q1, Q2) and the switching elements 13, 14 (Q3, Q4).

In the switching operation shown in FIG. 2(b), the ON/OFF-state of the series-connected switching element 11 (Q1) and switching element 12 (Q2) is reversed and the switching timing is synchronized, while the ON/OFF-state of the series-connected switching element 13 (Q3) and switching element 14 (Q4) is reversed and the switching timing is synchronized.

Moreover, in this switching operation, the timing of the transitions from OFF-state to ON-state of the switching element 11 (Q1) and switching element 13 (Q3) is synchronized, and the timing of the transitions from ON-state to OFF-state of the switching element 12 (Q2) and switching element 14 (Q4) is synchronized.

Further, in this switching operation, the timing of the transition to OFF-state of the switching element 11 (Q1) and the timing of the transition to ON-state of the switching element 12 (Q2) are synchronized. Moreover, the timing of the transition to OFF-state of the switching element 13 (Q3) and the timing of the transition to ON-state of the switching element 14 (Q4) are synchronized. Here, the timing of the transition to OFF-state of the switching element 11 (Q1) and the timing of the transition to OFF-state of the switching element 13 (Q3), for example, are not synchronized. This switching operation is for the case of outputting positive voltage.

In the foregoing case of outputting positive voltage, the control unit 30 makes the ON-duty of the switching element 11 (Q1) greater than the ON-duty of the switching element 13 (Q3), and, to the contrary, makes it smaller in the case of outputting negative voltage discussed later.

As indicated, for example, by "Transmission period" in FIG. 2(b), controlling the operation of the switching elements in the foregoing manner puts both the switching element 11 (Q1) and the switching element 14 (Q4) in ON-state and, in addition, establishes a period when both the switching element 12 (Q2) and the switching element 13 (Q3) are in OFF-state.

For example, where n-channel MOSFETs are used for the switching elements, if the high potential side voltage output from the isolated power supply 2 is applied to the connection point between the switching element 11 (Q1) and switching element 13 (Q3) (first connection point) and the low potential side voltage output from the isolated power supply 2 is applied to the connection point between the switching element 12 (Q2) and switching element 14 (Q4) (second connection point), then, as indicated by "Transmission period" in FIG. 2(b), when the switching elements are switching ON and OFF, current passes from the drain side of the switching element 11 (Q1) to the connection point between the switching element 11 (Q1) and switching element 12 (Q2) (third connection point of the full-bridge circuit 10) and supply current flows to the load 3 through the inductor 16. Further, current returning from the load 3 flows through the inductor 17 into the connection point between the switching element 13 (Q3) and switching element 14 (Q4) (fourth connection point of the full-bridge circuit 10) and further flows to the source side of the switching element 14 (Q4).

In the switching operation shown in FIG. 2(c), similarly to that shown in FIG. 2(b), the ON/OFF-state of the series-connected switching element 11 (Q1) and switching element 12 (Q2) is reversed and the switching timing is synchronized, while the ON/OFF-state of the series-connected switching element 13 (Q3) and switching element 14 (Q4) is reversed and the switching timing is synchronized.

Moreover, the timing of the transitions from OFF-state to ON-state of the switching element 11 (Q1) and switching element 13 (Q3) is synchronized, and the timing of the transitions from ON-state to OFF-state of the switching element 12 (Q2) and switching element 14 (Q4) is synchronized.

Further, in this switching operation, the timing of the transition to OFF-state of the switching element 11 (Q1) and the timing of the transition to ON-state of the switching element 12 (Q2) are synchronized. Moreover, the timing of the transition to OFF-state of the switching element 13 (Q3) and the timing of the transition to ON-state of the switching element 14 (Q4) are synchronized. Furthermore, the timing of the transition to OFF-state of the switching element 11 (Q1) and the timing of the transition to OFF-state of the switching element 13 (Q3), for example, are not synchronized.

When the control unit 30 controls the switching operation of the switching elements in the foregoing manner, it makes the ON-duty of the switching element 13 (Q3) greater than the ON-duty of the switching element 11 (Q1). The output voltage is negative voltage at this time.

Moreover, as indicated, for example, by "Transmission period" in FIG. 2(c), controlling the operation of the switching elements in the foregoing manner puts both the switching element 11 (Q1) and the switching element 14 (Q4) in OFF-state and, in addition, establishes a period when both the switching element 12 (Q2) and the switching element 13 (Q3) are in ON-state.

When, as in the foregoing, the high potential side voltage output from the isolated power supply 2 is applied to the connection point between the switching element 11 (Q1) and switching element 13 (Q3) and the low potential side of the voltage is applied to the connection point between the switching element 12 (Q2) and switching element 14 (Q4), then, as indicated by "Transmission period" in FIG. 2(c), when the switching elements are switching ON and OFF, current passes from the drain side of the switching element 13 (Q3) to the connection point between the switching element 13 (Q3) and switching element 14 (Q4) (the fourth connection point of the full-bridge circuit 10) and supply current flows from this connection point through the inductor 17 to the load 3. Further, current returning from the load 3 flows through the inductor 16 into the connection point between the switching element 11 (Q1) and switching element 12 (Q2) (the third connection point of the full-bridge circuit 10) and further flows to the source side of the switching element 12 (Q2).

As explained above, the full-bridge power converter 1 uses the output voltage of the isolated power supply 2 to output current from the output points (the third and fourth connection points) of the full-bridge circuit 10 during the "Transmission period" indicated in FIG. 2(b) or FIG. 2(c). Owing to the choking effect of the inductors 16 and 17, the current output from the output points of this full-bridge circuit 10 is DC current, and is additionally smoothed by the output capacitor 18 to be output to the load 3.

In the case where a full-bridge circuit is operated in the conventional manner with a two-level output, the effective value Irms of the ripple current flowing into the input capacitor is the same as the output current. For example, at an output current of 500 [A], the effective value Irms of the ripple current is 500 [A]. In contrast, in the case of operation with a three-level output in the manner of the full-bridge circuit 10 according to the present invention, the effective value Irms of the ripple current is reduced to the ratio of the transmission period (transmission period/one cycle of switching operation).

The full-bridge power converter 1 of this embodiment operates to produce a three-level output, and current flows both during the aforesaid positive or negative voltage output and also when this voltage assumes [0] level. Specifically, within the "Rest periods" indicated in FIGS. 2(b) and 2(c), in a period when the switching element 11 (Q1) and switching element 13 (Q3) are both in ON-state and, in addition, the switching element 12 (Q2) and switching element 14 (Q4) are both in OFF-state, the potential difference between the output points of the full-bridge circuit 10 disappears, and, as was explained using FIG. 2(a), inertial current flows owing to the discharge of energy W stored in the inductors 16 and 17.

In the operation shown in FIG. 2(b), the inertial current flows from the inductor 16 to the load 3, flows from the load 3 through the inductor 17 to the ON-state switching element 13 (Q3), and further flows from the switching element 13 (Q3) through the ON-state switching element 11 (Q1) to the inductor 16.

Moreover, in the operation shown in FIG. 2(c), the inertial current flows from the inductor 17 to the load 3, flows from the load 3 through the inductor 16 to the ON-state switching element 11 (Q1), and further flows from the switching element 11 (Q1) through the ON-state switching element 13 (Q3) to the inductor 17.

Further, within the "Rest period" indicated in FIG. 2(b) or 2(c), also in a period when the switching element 11 (Q1) and switching element 13 (Q3) are both in OFF-state and, in addition, the switching element 12 (Q2) and switching element 14 (Q4) are both in ON-state, the potential difference between the output points of the full-bridge circuit 10 disappears, and, as stated above, inertial current flows owing to the discharge of energy W stored in the inductors 16 and 17. The inertial current at this time flows through the ON-state switching element 12 (Q2) and switching element 14 (Q4), with the rest of current paths being the same as explained above.

FIG. 3 is a set of explanatory diagrams showing the operation of the full-bridge power converter of FIG. 1. The diagrams are timing charts representing the ON/OFF-states of the switching elements of the full-bridge circuit 10, and show a state transition A representing the operating pattern of one switching element and a state transition B representing the operating pattern of another switching element.

In the states shown in FIG. 3, the high level portions represent ON-state and the low level portions represent OFF-states.

Moreover, the state transition A represents the ON/OFF operation of the switching element 11 (Q1), for example, and the state transition B represents the ON/OFF operation of the switching element 13 (Q3).

Here, where the time duration in the state transition of whichever of the state transition A and state transition B is shorter ON-state period (narrower time width) is defined as Tm and an overlap period of ON-state of state transition A and ON-state of the state transition B is defined as Td, the ratio of the overlap period Td to the time duration Tm is defined as drive overlap ratio Rd (Rd=Td/Tm). In the example of FIG. 3, the state transition A is the one whose given state (ON-state here) is of shorter time duration and the state transition B is the one whose given state (ON-state) is of longer time duration.

Figure 3A:
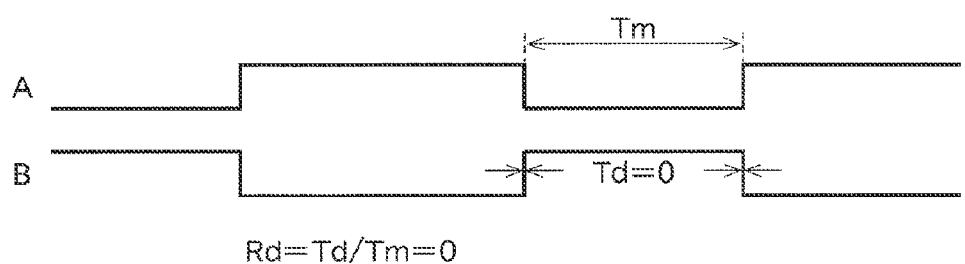
FIGS. 3(a) and (b) are explanatory diagrams showing the operation of the full-bridge power converter of FIG. 1.

FIG. 3(a) shows conventionally practiced, ordinary switching operation, and indicates a state transition A representing an operating pattern of the switching element 11 (Q1), for example, and a state transition B representing an operating pattern of the switching element 13 (Q3).

In the switching operation exemplified in FIG. 3(a), when the respective switching elements transit from ON-state to OFF-state, or from OFF-state to ON-state, the delay time (the aforesaid dead time) that arises is of infinitesimal order and can be deemed [0]. Then, where the low-level period in the state transition A and the high-level period in the state transition B are defined as Tm, respectively, it follows from the assumption of period Td being [0] that the drive overlap ratio Rd becomes Td/Tm=0, so that no period during which inertial current flows owing to the inductors 16 and 17 occurs.

Figure 3B:
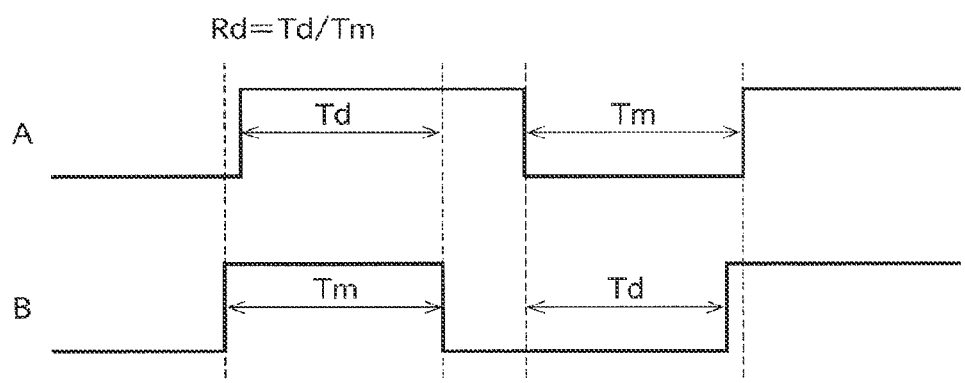

FIG. 3(b) shows an example of the switching operation of the full-bridge circuit 10 according to this embodiment. Similarly to in FIG. 3(a), the state transition A in FIG. 3(b) represents the operating pattern of, for example, the switching element 11 (Q1), while the state transition B represents the operating pattern of the switching element 13 (Q3).

In FIG. 3(b), the high-level side time duration of the state transition B is shorter than that of the state transition A. Moreover, the low-level side time duration of the state transition A is shorter than that of the state transition B. These shorter time durations are defined as Tm. Further, during the period when the state transition B is high level for the time duration Tm, a period when the state transition A is high level is defined as Td. Further, during the period when the state transition A is low level for the time duration Tm, a period when the state transition B is low level is defined as Td. Since the aforesaid inertial current flows during the period Td, the period during which the inertial current flows is longer in proportion as the drive overlap ratio Rd is greater.

Moreover, the period of current output using the output voltage of the isolated power supply 2 symmetrically becomes short. In other words, the period during which the state transition A is ON-state and the state transition B is OFF-state and the period during which the state transition A is OFF-state and the state transition B is ON-state become short.

Thus, the output voltage of the isolated power supply 2 is switched to shorten the period of current output and suppress the size of the ripple component, and during the period when current is not output, inertial current is passed to maintain the DC current flow into the load 3.

In a case where, for example, power of 10 [kW] or greater is output to the load 3, the control unit 30 switches the switching elements of the full-bridge circuit 10 at 20 [kHz] or less, and when the load 3 is light, switches them at several hundred [kHz]. Further, depending on the size of the output power, the ON-duties of the switching elements are regulated and switching element control signals are generated to operate the full-bridge circuit 10 so that the aforesaid drive overlap ratio Rd=(Td/Tm)×100% becomes 50% or greater, for example, Here, defining the output current of the full-bridge power converter 1 as "I", then, in operation that makes the drive overlap ratio Rd=0%, as shown in FIG. 3(a), the effective value Irms of the ripple current flowing into the input capacitor 15 becomes equal to the output current value I.

Further, defining the ON-duty during current output as "D", then, in operation that makes the drive overlap ratio Rd=100% (Td=Tm), the effective value Irms of the ripple current becomes proportional to I×(1-2D).

For example, in the case of operation in which a voltage of 40 [V] is input to the full-bridge circuit 10 and a voltage of 4 [V] is produced across the terminals of the load 3, then, when the control unit 30 operates the switching elements to make the ON-duty D 45%, if Rd is made 100% in this operation, the effective value of the ripple current becomes 1/10 relative to that in the case of Rd=0%.

Thus, ripple current can be effectively reduced by switching operation that achieves Rd=50~100%.

Moreover, regarding the input capacitor 15 (smoothing capacitor), even in the case where a ripple tolerance of 360 [A] would be necessary in the case of operating in the conventional manner at Rd=0%, use of the input capacitor 15 having a ripple tolerance of around 36 [A] becomes possible by operation at Rd=100%.

When the full-bridge power converter 1 operates, the switching operation of the full-bridge circuit 10 generates voltage fluctuation (noise).

Even in a condition where potential difference between the output points of the full-bridge circuit 10 has been eliminated by operating the full-bridge circuit 10 so as to inhibit ripple current, the output points nevertheless have positive or negative voltage relative to the frame ground. Specifically, when, for example, the switching element 11 and switching element 13 both assume ON-state, the high potential side voltage output from the isolated power supply 2 is applied to the switching elements 11 and 13. Common-mode voltages therefore appear at the third connection point and fourth connection point.

For example, where the voltage to frame ground of the third connection point (first output point) of the full-bridge circuit 10 is defined as V1 and the voltage to frame ground of the fourth connection point (second output point) of the full-bridge circuit 10 is defined as V2, a common-mode voltage of (V1+V2)/2 appears across the output capacitor 18 or between the output terminals of the full-bridge power converter 1.

The common-mode voltage of (V1+V2)/2 indicates the size of the noise produced by the ON/OFF operation of the switching elements, and in the condition where the first output point and second output point of the full-bridge circuit 10 are connected, the common-mode noise including this noise presents on the output line between the inductor 16 and first output terminal of the full-bridge power converter 1 and on the output line between the inductor 17 and the second output terminal of the full-bridge power converter 1.

Figure 4:
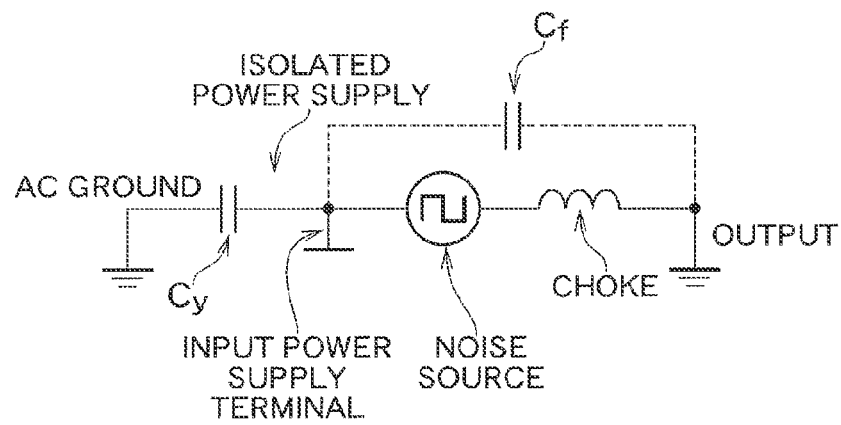
FIG. 4 is an equivalent circuit diagram of the full-bridge power converter of FIG. 1.

FIG. 4 is an equivalent circuit diagram of the full-bridge power converter of FIG. 1. In this drawing, the noise source is the switching elements of the full-bridge circuit 10, the choke is the inductor 16 (or inductor 17), and Cy is the Y capacitors connected between the output terminal of the isolated power supply 2. Further, CF connected between the output side of the choke and the input terminal of the full-bridge power converter 1 corresponds to the filter capacitor 19 (or filter capacitor 20) of FIG. 1.

Common-mode noise appearing on the output line of the full-bridge power converter 1 passes through, inter alia, a grounded part of the power supply circuit not shown in the converter illustration or a case frame ground connection to enter the circuit of the isolated power supply 2 from the AC ground of the isolated power supply 2, e.g., the ground point of the Y capacitor of the isolated power supply 2, to propagate to the input side of the full-bridge power converter 1 from the output terminal of the isolated power supply 2 and increase on the output lines.

The common-mode noise appearing on the output line is therefore extracted by a low-pass filter constituted by the filter capacitor CF and the choke to be absorbed by the filter capacitor CF.

The voltage across the filter capacitor 19 (for example) of FIG. 1 that corresponds to the filter capacitor CF becomes the voltage across the grounding to earth (or the frame ground) and the output terminal of the full-bridge power converter 1.

As pointed out earlier, the size of the common-mode noise can be expressed as (V1+V2)/2, and when the full-bridge power converter 1 operates so that load current becomes 360 [A] and output voltage becomes 0 [V] (when inductance is minimum), this electric power energy corresponds to the state of outputting voltage Vin input to the full-bridge power converter 1 at a duty ratio of 50%.

The filter capacitor 19 and filter capacitor 20 have the same capacitance and, as shown in FIG. 1, are connected respectively to the input points on the high-potential side and low-potential side of the full-bridge circuit 10 to be symmetrical within the electric circuit and function similarly. Now follows an explanation taking the filter capacitor 19 as an example.

Where the current containing common-mode noise (current output from the full-bridge circuit 10 through the inductor 16, for example) is defined as I, the current waveform is triangular. The slope of this waveform is expressed as $dI/dt=Vin/2L$ and its amplitude Ipp is expressed as $$Ipp = (dI/dt) \times (1/2f)$$
$$= Vin/(4fL).$$

The charge Q stored by the respective filter capacitors 19 and 20 is the area of one triangular wave (½ cycle) of the aforesaid current waveform and can be determined as $$Q=(Ipp/2)\times(1/(2f)\times(\tfrac{1}{2})$$

and expressed as $$Q=Vin/(32Lf^2),$$

where L is the inductance of each of the inductors 16 and 17, and f is an arbitrary frequency of the common-mode noise component (e.g., the switching frequency of the full-bridge circuit 10). Further, the charge Q is the charge forming the common-mode noise component.

Here, where the peak-to-peak value of the common-mode noise voltage amplitude is defined as Vpp, then since $$Vpp=Q/C,$$

the capacitance Cf of the filter capacitors 19 and 20 required for making the voltage amplitude of the common-mode noise the voltage peak-to-peak value Vpp is expressed as $$Cf=Q/Vpp.$$

If the size (voltage amplitude) of the common-mode noise is to be held to Vpp or less, the capacitance Cf of the filter capacitors 19 and 20 must be equal to or greater than Q/Vpp. In other words, if the filter capacitors 19 and 20 have a capacitance of at least Q/Vpp, the frequency f component of the common-mode noise can be reduced to the voltage peak-to-peak value Vpp.

In the case where Vin=60 [V], f=20 [kHz] and L=30 [μH], for example, Q=156 [μC]. This means that when the filter capacitor 19 has a capacitance of 156 [μF], for example, the voltage across the filter capacitor 19 is 1 [$V_{0-P}$].

In order to suppress the voltage amplitude of the common-mode noise to around $\tfrac{1}{1000}^{th}$, for example, the filter capacitors 19 and 20 need to have about 1000 times the capacitance of the charge Q.

In the foregoing example, reduction of the voltage across the filter capacitor 19, i.e., the voltage peak-to-peak value of the common-mode noise, to about 1 [mV] requires the filter capacitor 19 to have a capacitance of 15,000 [μF] or greater. In this instance, the current flowing through the filter capacitor 19 becomes 156 [μC]×2 f=6 [A].

Depending on the type of the load 3 connected to the full-bridge power converter 1, the purpose for which the output power of the full-bridge power converter 1 is used and other factors, the allowable size of the common-mode noise contained in the output power of the converter is determined. The filter capacitors 19 and 20 are given a capacitance for reducing common-mode noise to an allowable size in view of such factors as the type of load 3, the purpose of use and the like.

When the filter capacitors 19 and 20 are to have considerable capacitance as in the foregoing, for example, electrolytic capacitors or the like can be used. A configuration that connects multiple capacitors to establish the desired capacitance is also acceptable.

Moreover, in light of the fact that the common-mode noise contains not only the aforesaid voltage fluctuation produced by the switching operation but also high-frequency components attributable to various causes, the filter capacitors 19 and 20 are configured to include capacitors with capacitance for dealing with these high-frequency components.

As shown in FIG. 1, the filter capacitor 19 and inductor 16 form a low-pass filter, and the filter capacitor 20 and inductor 17 form a low-pass filter similar to the foregoing.

Common-mode noise occurring on the output line between the third connection point of the full-bridge circuit 10 and the first output terminal of the full-bridge power converter 1 is filtered by the low-pass filter including the filter capacitor 19, so that stable current inhibited in common-mode noise flows to the first output terminal.

Further common-mode noise occurring on the output line between the fourth connection point of the full-bridge circuit 10 and the second output terminal of the full-bridge power converter 1 is filtered by the low-pass filter including the filter capacitor 20, so that stable current inhibited in common-mode noise flows to the second output terminal.

Although ripple current can be lowered by operating the full-bridge circuit 10 with the drive overlap ratio Rd increased, this prolongs the period during which the two output points of the full-bridge circuit 10 are connected.

No return current flows to the isolated power supply 2 during this period because a condition arises in which only the output terminal on one side of the isolated power supply 2 is connected to the output lines of the full-bridge power converter 1. As a result, the voltage applied from the output terminal on the one side of the isolated power supply 2 stores electric power energy in the output line and produces large common-mode noise in the output line.

In the full-bridge power converter 1, when the two output points of the full-bridge circuit 10 are connected to pass inertial current, electric power energy residing on the output lines is absorbed by the filter capacitors 19 and 20, thereby reducing the common-mode noise that grows larger during operation for reducing ripple current.

As explained in the foregoing, according to the full-bridge power converter of this embodiment, the periods during which the full-bridge circuit 10 performs current output using the output voltage of the isolated power supply 2 are shortened and inertial current is passed by using energy stored in the inductor 16 and inductor 17 during periods when current using the output voltage of the isolated power supply 2 is not output, thus ripple current contained in the output current of the full-bridge circuit 10 can be held to be smaller to capable of outputting high-precision current.

Moreover, ripple current occurring on the input side of the full-bridge circuit 10 can be held lower, thereby enabling use of an input capacitor 15 of small ripple tolerance and, in addition, making it possible, inter alia, to lower the cost of peripheral circuitry, enhance efficiency by decreasing power loss, and reduce equipment size.

Further, since the filter capacitors 19 and 20 are installed with consideration to the frequency of the common-mode noise component to be removed and have capacitance capable of storing the charge of the common-mode noise component, appearance of common-mode noise on the output lines of the full-bridge power converter 1 can be reduced.

Of particular note is that when the full-bridge circuit 10 is operated with the drive overlap ratio Rd set at 50% or greater, high-precision power inhibiting both ripple current and common-mode noise can be output.

INDUSTRIAL APPLICABILITY

The full-bridge power converter according to this invention outputs power with suppressed ripple current and common-mode noise and is therefore suitable for power conversion at the time of charging a secondary cell requiring high-precision voltage application or current supply or of measuring the discharge and charge characteristics of a secondary cell.

REFERENCE SIGN LIST

1 FULL-BRIDGE POWER CONVERTER
2 ISOLATED POWER SUPPLY
3 LOAD
10 FULL-BRIDGE CIRCUIT
11~14 SWITCHING ELEMENT
15 INPUT CAPACITOR
16, 17 INDUCTOR
18 OUTPUT CAPACITOR
19, 20 FILTER CAPACITOR
30 CONTROL UNIT

The invention claimed is:

1. A full-bridge power converter comprising:
a full-bridge circuit constituted by series-connecting one end of a first switching element and one end of a second switching element, series-connecting one end of a third switching element and one end of a fourth switching element, and parallel-connecting the series-connected first and second switching elements and the series-connected third and fourth switching elements;
a control unit for individually controlling ON/OFF operation of the first switching element to the fourth switching element;
an input capacitor connected between a first connection point connecting between another end of the first switching element and another end of the third switching element and a second connection point connecting between another end of the second switching element and another end of the fourth switching element;
a first inductor connected at one end to a third connection point connecting between the one end of the first switching element and the one end of the second switching element;
a second inductor connected at one end to a fourth connection point connecting between the one end of the third switching element and the one end of the fourth switching element;
an output capacitor connected between another end of the first inductor and another end of the second inductor;
a first filter capacitor connected between the other end of the first inductor and the first connection point; and
a second filter capacitor connected between the other end of the second inductor and the second connection point, wherein,
when a power supply that outputs DC voltage is connected to opposite ends of the input capacitor and a load is connected to opposite ends of the output capacitor,
the control unit
generates control signals for the individual switching elements for controlling ON/OFF operation of the switching elements,
turns the first switching element and the second switching element ON and OFF alternately and turns the third switching element and the fourth switching element ON and OFF alternately to output from the full-bridge circuit supply current for supplying to the load,
during a period when the supply current is not output, turns ON both the first switching element and the third switching element and turns OFF both the second switching element and the fourth switching element to connect between the third connection point and the fourth connection point and pass inertial current by discharging energy stored in the first and second inductors, and
when whichever of the ON-state time durations of the first switching element and the third switching element is shorter is defined as time duration Tm, an overlap period wherein an ON/OFF-state of a switching element whose ON-state time duration is longer and an ON/OFF-state of a switching element whose ON-state time duration is shorter are the same is defined as Td, and a drive overlap ratio indicating a ratio of the overlap period Td to the time duration Tm is defined as Rd=(Td/Tm)×100%, controls operation of the switching elements to make the drive overlap ratio Rd not less than 50% and not greater than 100%,
the first and second filter capacitors
have capacitance for storing charge of a common-mode noise component occurring on an output line connecting the first inductor and the output capacitor and an output line connecting the second inductor and the output capacitor, and
absorb common-mode noise occurring when both the first switching element and the third switching element are turned ON and both the second switching element and the fourth switching element are turned OFF.

2. The full-bridge power converter set out in claim 1, wherein,
where voltage input to the full-bridge circuit is defined as Vin, frequency of common-mode noise to be suppressed is defined as f, and inductance of the first and second inductors is defined as L, and the charge of the common-mode noise component is determined as $Q=Vin/(32Lf^2)$,
the first and second filter capacitors have capacitance of Q/Vpp or greater when voltage amplitude of the common-mode noise is held to Vpp or less.

* * * * *